US006937427B2

(12) United States Patent
Tan et al.

(10) Patent No.: US 6,937,427 B2
(45) Date of Patent: Aug. 30, 2005

(54) METHOD AND APPARATUS FOR MEASURING THE BACK EMF OF A DISC DRIVE VCM

(75) Inventors: LeeLing Tan, Singapore (SG); Xiong Liu, Singapore (SG); ChoonKit Lim, Singapore (SG); MuiChong Chai, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 99 days.

(21) Appl. No.: 10/465,713

(22) Filed: Jun. 19, 2003

(65) Prior Publication Data

US 2004/0257695 A1 Dec. 23, 2004

(51) Int. Cl.⁷ .......................... G11B 5/596; G11B 21/02
(52) U.S. Cl. ...................... 360/78.04; 360/75; 318/254
(58) Field of Search ................................ 360/78.04, 75, 360/78.01, 78.06, 78.07, 78.11, 78.12; 318/561, 569, 430, 439, 445, 254, 459

(56) References Cited

U.S. PATENT DOCUMENTS

| 5,128,813 | A | * | 7/1992 | Lee | ......................... 360/78.07 |
|---|---|---|---|---|---|
| 5,495,377 | A | | 2/1996 | Kim | |
| 5,615,064 | A | | 3/1997 | Blank et al. | |
| 5,831,786 | A | | 11/1998 | Boutaghou et al. | |
| 5,936,788 | A | | 8/1999 | Boutaghou et al. | |
| 5,973,887 | A | | 10/1999 | Cameron | |
| 6,229,663 | B1 | | 5/2001 | Yoneda et al. | |
| 6,392,375 | B1 | | 5/2002 | Portaluri et al. | |
| 6,507,460 | B2 | | 1/2003 | Fayeulle et al. | |
| 6,731,450 | B1 | * | 5/2004 | Codilian et al. | ............... 360/69 |
| 6,760,178 | B2 | * | 7/2004 | Shibata | ........................ 360/75 |
| 6,795,268 | B1 | * | 9/2004 | Ryan | ...................... 360/78.04 |
| 2001/0012171 | A1 | | 8/2001 | Lu et al. | |
| 2001/0019463 | A1 | | 9/2001 | Drouin | |
| 2002/0196575 | A1 | | 12/2002 | Harmer | |
| 2003/0048571 | A1 | | 3/2003 | Soyama et al. | |
| 2003/0065469 | A1 | | 4/2003 | Pedrazzini et al. | |
| 2004/0047064 | A1 | * | 3/2004 | Kusumoto et al. | ............ 360/75 |
| 2004/0124800 | A1 | * | 7/2004 | Tanner | ....................... 318/471 |

* cited by examiner

Primary Examiner—Andrew L. Sniezek
(74) Attorney, Agent, or Firm—Kirk A. Cesari

(57) ABSTRACT

An apparatus and method of measuring a back electromotive force (BEMF) voltage of a disc drive voice coil motor (VCM) is provided in which a temperature of the VCM is obtained. The BEMF voltage of the VCM is computed as a function of the temperature of the VCM.

16 Claims, 4 Drawing Sheets

METHOD AND APPARATUS FOR MEASURING THE BACK EMF OF A DISC DRIVE VCM

FIELD OF THE INVENTION

The present invention is related to disc drives. In particular, the present invention is related to measuring the back electromotive force voltage generated by a voice coil motor of a disc drive.

BACKGROUND OF THE INVENTION

Data storage devices, and in particular, disc drives that read and write information on disc-shaped storage media, usually employ either a rotary arm actuator mechanism or a linear actuator mechanism for positioning the read/write head(s) of the disc drive over successive tracks of the disc-shaped storage medium. In most disc drives, the rotary arm or linear actuators are moved to a retracted, or parked position when the disc drive is not in use. In such a retracted position, the read/write heads of the disc drive are moved off and away from the surface(s) of the storage medium in order to prevent damage to the head(s) and storage medium. In order to resume use of the disc drive, the read/write heads must once again be loaded onto the surface(s) of the storage medium so that the data transfer can begin. It is important that the head loading operation be carried out in a controlled manner to prevent damage to the read/write heads.

Some disc drives support a head loading velocity control mechanism for a disc drive that measures the back electromotive force (BEMF) voltage across the actuator (for example a voice coil motor (VCM) actuator) of the disc drive to obtain an indication of the velocity of the actuator. The measured BEMF voltage is then employed in a control scheme to control the velocity of the actuator during a head loading operation. To perform stable velocity control, it is indispensable to accurately detect the BEMF voltage serving as velocity control information.

One existing technique to control the velocity of the VCM computes the VCM BEMF voltage based on the assumption that a VCM coil resistance is substantially constant. However, the VCM coil is subject to temperature changes and the resistance of the coil greatly changes depending on temperature. Thus, the assumption that the VCM coil resistance is constant may result in inaccurate BEMF voltage measurements and therefore improper VCM velocity control.

Embodiments of the present invention provide solutions to these and other problems, and offer other advantages over the prior art.

SUMMARY OF THE INVENTION

The present embodiments relate to disc drive storage systems that employ a voice coil motor (VCM) back electromotive force (BEMF) measurement scheme that takes into consideration changes in VCM coil resistance due to variations in temperature, thereby addressing the above-mentioned problems.

An apparatus and method of measuring BEMF voltage of a disc drive VCM is provided in which a temperature of the VCM is obtained. The BEMF voltage of the VCM is computed as a function of the temperature of the VCM.

Other features and benefits that characterize embodiments of the present invention will be apparent upon reading the following detailed description and review of the associated drawings.

DETAILED DESCRIPTION OF ILLUSTRATIVE EMBODIMENTS

In the embodiments described below, an apparatus and method are provided for measuring the back electromotive force (BEMF) voltage of a disc drive voice coil motor (VCM). The measurement of the BEMF of the VCM is carried out by obtaining a temperature of the VCM and computing the BEMF voltage of the VCM as a function of the temperature of the VCM. Although the BEMF measurement technique of the present invention is described below in connection with a disc drive employing a ramp block to hold the head suspension assembly when the disc drive is not operated, the present invention can also be employed in disc drives that use other head loading/unloading mechanisms.

Figure 1:
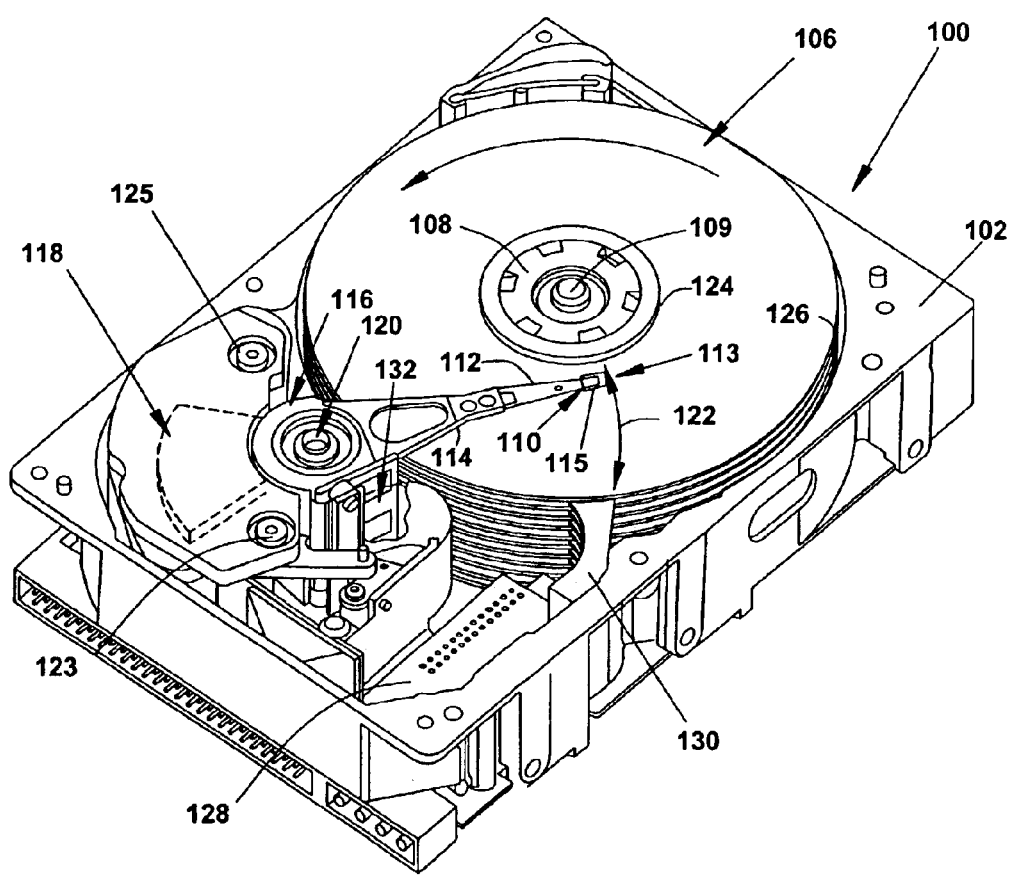
FIG. 1 is a perspective view of a disc drive in which aspects of the present invention may be practiced.

Referring now to FIG. 1, a perspective view of a disc drive 100 in which the present invention is useful is shown. Disc drive 100 includes a housing with a base 102 and a top cover (not shown). Disc drive 100 further includes a disc pack 106 which is mounted on a spindle motor (not shown in FIG. 1) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. Additionally, extending from distal ends 113 of suspensions 112 are lift tabs 115 for engagement with ramps of a load/unload ramp block 130. Load/unload ramp block 130 is used to facilitate the removal of sliders/transducers 110 away from discs 106 to a parked position adjacent discs 106 when the disc drive is de-energized.

The actuator shown in FIG. 1 is of the type known as a rotary moving coil actuator and includes a VCM, shown generally at 118. VCM 118 rotates actuator 116 with its attached head 110 about a pivot shaft 120 to position head 110 over a desired data track along an arcuate path 122 between a disc inner diameter (ID) 124 and a disc outer diameter (OD) 126. ID crash stop 123 and OD crash stop 125 are included to limit the movement of actuator 116. Also included, is a temperature sensor 132 that is thermally coupled to VCM 118. In some embodiments, temperature sensor 132 includes a thermistor. In general, VCM 118 is driven by electronic circuitry 128 based on signals generated by heads 110 and a host computer (not shown). Signals generated by heads 110 can be used to control the velocity of actuator 116 when heads 110 are flying over the disc surfaces. However, when heads 110 are proximate ramps of ramp block 130 during head load/unload operations, they do not generate signals that are suitable for actuator velocity control. Therefore, BEMF fed back from the VCM coil is utilized as the load/unload velocity feedback signal. As noted above, to perform stable velocity control, it is indispensable to accurately detect the BEMF voltage serving as velocity control information.

As mentioned above, one existing technique to control the velocity of the VCM computes the VCM BEMF voltage based on the assumption that a VCM coil resistance is substantially constant. In this technique, the VCM BEMF, $V_{bemf}(t)$, is computed as:

$$V_{bemf}(t)=V_m-R_m*i(t) \quad \text{Equation 1}$$

where $R_m$ is the nominal resistance of the VCM coil, i(t) is the VCM current and $V_m$ is the voltage across the VCM. However, as mentioned above, the VCM coil is subject to temperature changes and the resistance of the coil greatly changes depending on temperature. Thus, after the drive is in operation for a period of time, the associated rise in temperature will increase the value of the VCM coil resistance such that $$R=R_m+\Delta R \quad \text{Equation 2}$$

where R is the actual VCM coil resistance under current operating conditions. Consequently, the actual VCM BEMF voltage, $\hat{V}_{bemf}(t)$, will change as temperature rises due to the VCM coil resistance change ($\Delta R$). Hence, by including $\Delta R$ in Equation 1 the following is obtained:

$$\hat{V}_{bemf}(t)=V_m-(R_m+\Delta R)*i(t) \quad \text{Equation 3}$$

By substituting Equation 1 into Equation 3, it follows that $$\hat{V}_{bemf}(t)=V_{bemf}-\Delta R*i(t) \quad \text{Equation 4}$$

The approximation of $\hat{V}_{bemf}(t)$ to $V_{bemf}$ is valid only when both $\Delta R$ and i(t) are small.

Figure 2:
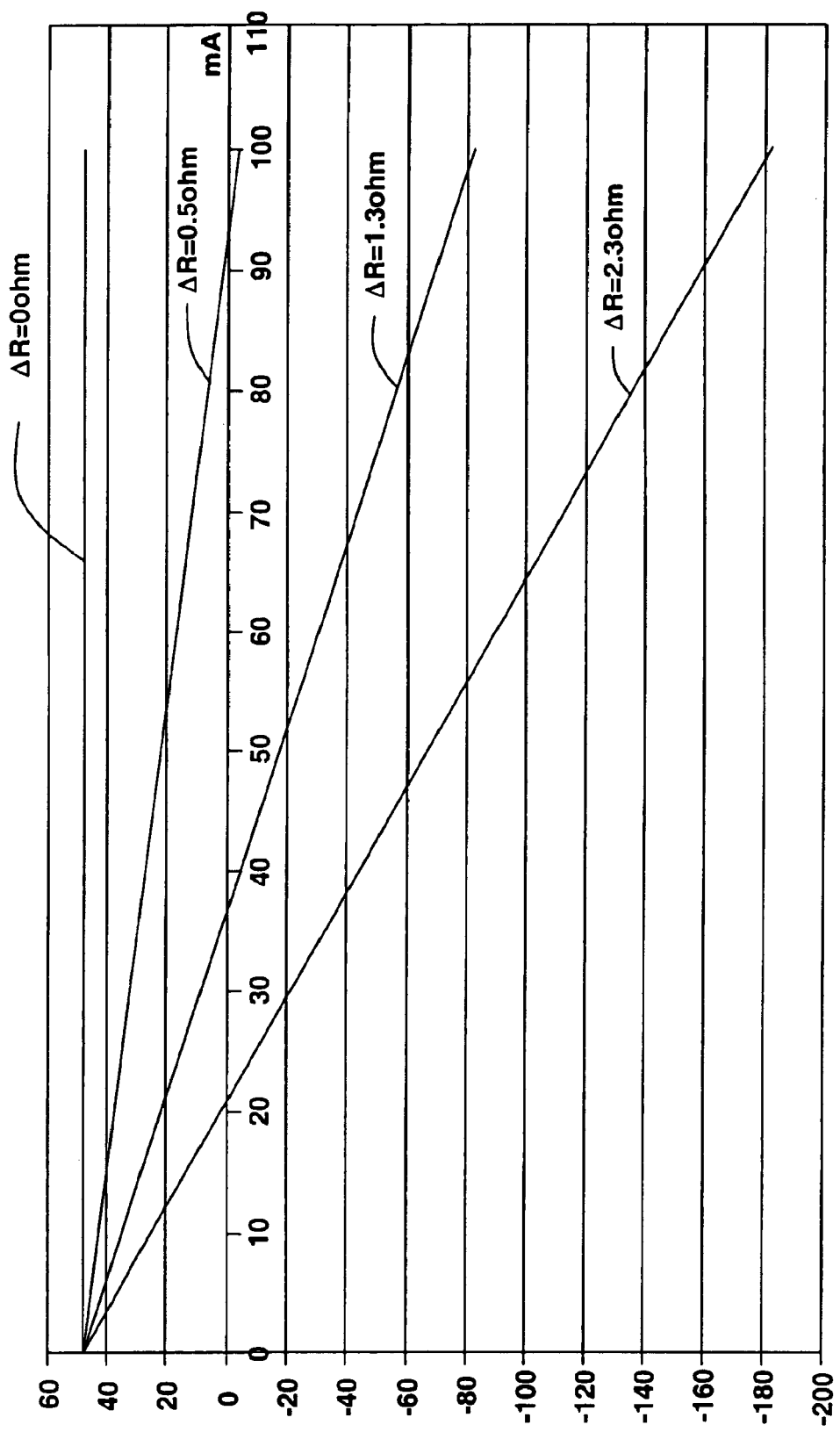
FIG. 2 is a graph illustrating changes in voice coil motor (VCM) back electromotive force (BEMF) voltage due to changes in VCM coil resistance.

FIG. 2 includes plots of $\hat{V}_{bemf}(t)$ in millivolts (mV) along the vertical axis versus i(t) in milliamps (mA) for different values of $\Delta R$. It can be seen from the plots that the VCM BEMF voltage changes substantially when current i(t) and $\Delta R$ increase.

Under the present invention, the VCM BEMF measurement scheme takes into consideration changes in VCM coil resistance due to variations in temperature, thereby providing improved velocity control information. Specifically, a temperature of the VCM is obtained and the BEMF voltage of the VCM is computed as a function of the temperature of the VCM. A description of VCM BEMF measurement in accordance with the present invention is provided below in connection with FIGS. 3 and 4.

Figure 3:
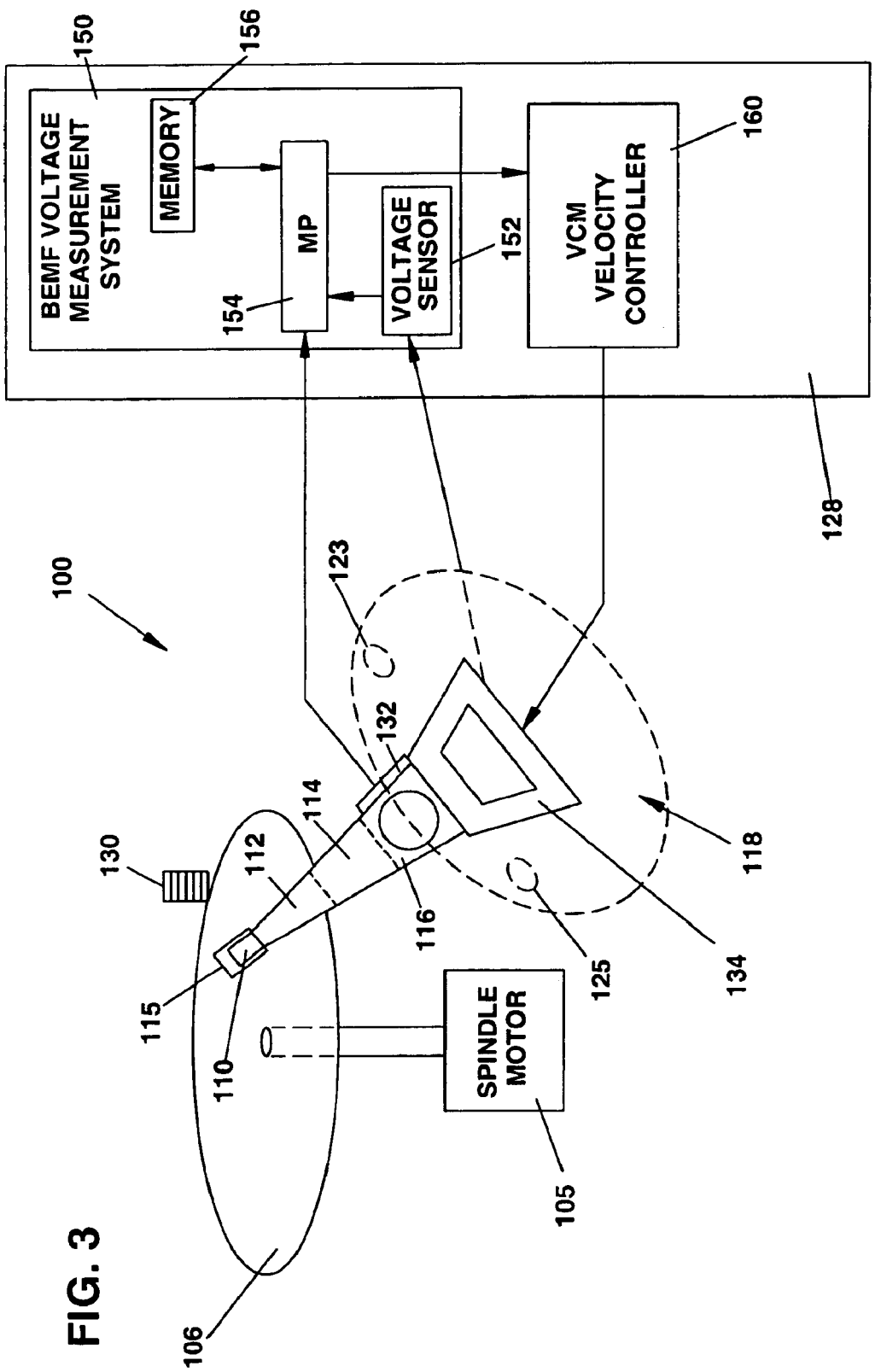
FIG. 3 is a block diagram of a disc drive including a VCM BEMF voltage measurement circuit or system of the present invention.
Figure 4:
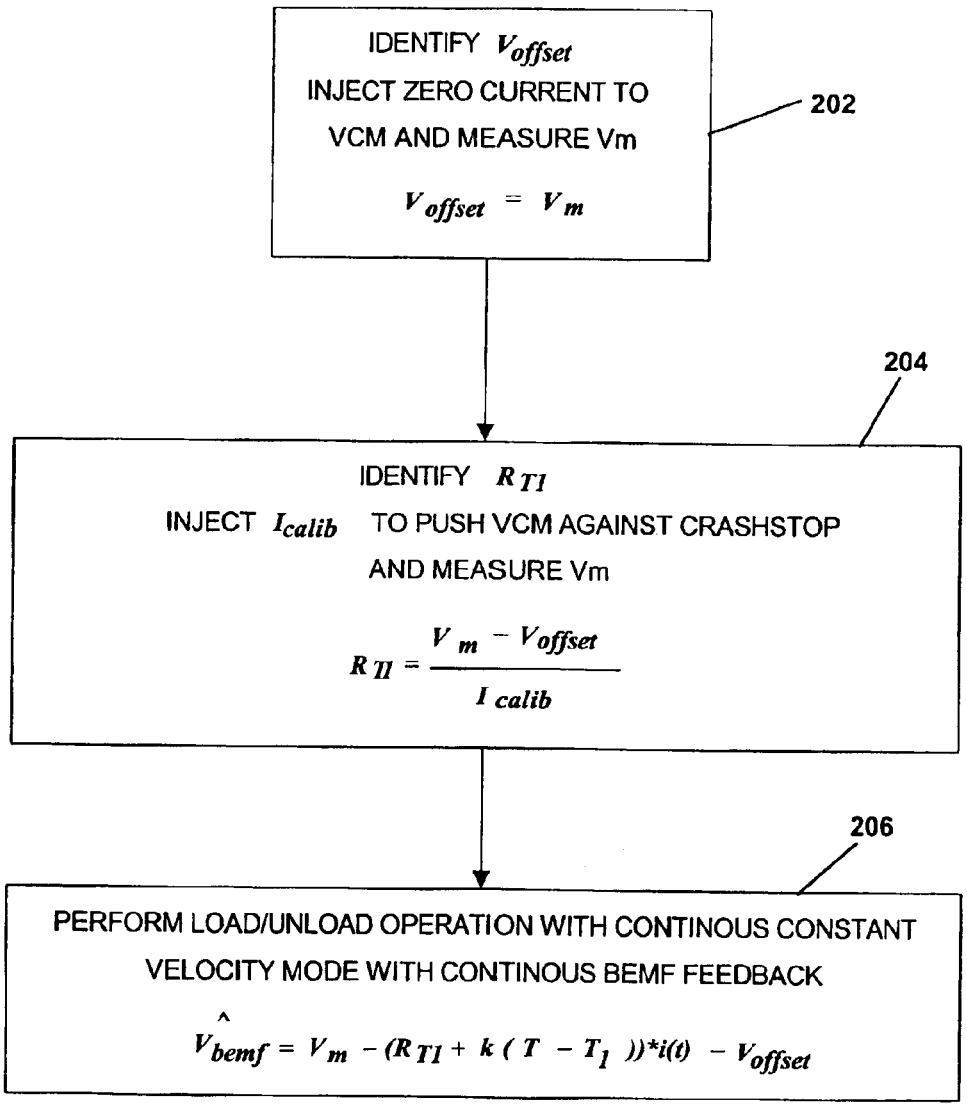
FIG. 4 is a flow chart illustrating a method of measuring the BEMF voltage of a VCM in accordance with an embodiment of the present invention.

FIG. 3 is a simplified block diagram of disc drive 100 including a BEMF voltage measurement circuit or system 150 of the present invention. The same reference numerals are used to represent the same or similar elements in FIGS. 1 and 3. In FIG. 3, for simplification, disc pack 106 is shown as including only a single disc. As noted above, transducer 110, which communicates with the surface of disc 106, is supported by suspension 112 which is in turn attached to track accessing arm 114 of actuator 116. Also shown, is VCM coil 134, which is included within VCM 118 and coupled to actuator 116. When disc dive 100 is energized, spindle motor 105 rotates disc 106. As can be seen in FIG. 3, circuitry 128 (also shown in FIG. 1) includes BEMF voltage measurement system 150 and VCM velocity controller 160. BEMF measurement system 150 computes the VCM BEMF voltage and provides the computed BEMF voltage to velocity control circuitry 160, which in turn controls the velocity of the VCM as a function of the VCM BEMF during head load/unload operations.

BEMF voltage measurement system 150 includes a VCM voltage sensor 152, a microprocessor system 154 and a memory 156. For simplification, analog to digital converters for providing measurements in digital form to microprocessor system 154 have been excluded form FIG. 3. Microprocessor system 154, which operates based on instructions stored in memory 156, computes the VCM BEMF voltage as a function of a VCM temperature measured by sensor 132, VCM voltage measured by circuitry 152 and one or more predetermined values/constants which are stored in memory 156. The computed BEMF voltage is provided by microprocessor system 154 to velocity control circuitry 160. In some embodiments, microprocessor system 154 of BEMF voltage measurement system 150 operates in conjunction with velocity control circuitry 160 to determine the VCM coil resistance at disc drive startup, and to further determine an offset voltage of electronic circuitry associated with the VCM. These values can be stored in memory 156 and utilized to adjust VCM BEMF voltage values to thereby provide accurate BEMF measurements.

The magnitude and direction of the VCM BEMF voltage is indicative of the velocity and direction of movement of the VCM coil. Using the VCM BEMF voltage magnitude and direction, VCM velocity controller 160 adjusts a magnitude and direction of current supplied to VCM coil 134, which in turn results in necessary changes in VCM velocity. Since the present invention is primarily related to accurate VCM BEMF measurement, details regarding components and operation of velocity control circuitry 160 have not been included. An example algorithm, which can be implemented in microprocessor system 154 of BEMF sensing system 150, is described below in connection with FIG. 4 and Equations 5–9.

By taking into consideration the offset voltage of the electrical hardware circuitry associated with the VCM, the actual VCM BEMF voltage is expressed as:

$$\hat{V}_{bemf}(t)=V_m-R*i(t)-V_{offset} \quad \text{Equation 5}$$

where $V_m$ is the total voltage measured across the VCM coil. Further, the actual resistance of the VCM is expressed as:

$$R=R_{T1}+k(T-T_1) \quad \text{Euqation 6}$$

where $R_{T1}$ is the resistance of the VCM at an initial VCM temperature, $T_1$, at disc drive startup, k is the temperature coefficient of the VCM coil and T is the current VCM temperature measured by temperature sensor 132. Temperature coefficient k is well known for a certain material of the VCM coil and constant over the entire range of the drive operating temperature.

The computation of $V_{offset}$ (step 202 in FIG. 4) and $R_{T1}$ (step 204 in FIG. 4) are carried out when the actuator is in a parked position. These quantities are computed as follows:

1) Identification of $V_{offset}$

At initial temperature ($T_1$), the voltage across the VCM coil, $V_m$, is measured with no current injected in the VCM coil. Since the VCM is in a parked position, no BEMF voltage is generated. Thus, substituting i(t)=0 and $\hat{V}_{bemf}(t)=0$ in Equation 5, it follows that $V_m$ measured across the VCM coil is the offset voltage of the electrical hardware circuitry, $V_{offset}$, which is expressed as:

$$V_{offset}=V_{m\_0} \quad \text{Equation 7}$$

where $V_{m\_0}$ is the voltage across the VCM coil when no current is injected in the VCM coil.

2) Identification of $R_{T1}$

At initial temperature ($T_1$) calibration current $I_{calib}$ is injected in the VCM coil to push the actuator against a crash stop (such as 123, 125) and, at a parked position, the voltage across the VCM coil, $V_m$, is measured. Substituting $i(t)=I_{calib}$, $\hat{V}_{bemf}(t)=0$ and Equation 7 into Equation 5, the following is obtained:

$$R_{T1} = \frac{V_{m\_T1} - V_{m\_0}}{I_{calib}} = \frac{V_{m\_T1} - V_{offset}}{I_{calib}} \quad \text{Equation 8}$$

where $V_{m\_T1}$ is the voltage measured across the VCM when current $I_{calib}$ is injected into the VCM coil.

From the above Equations it follows that:

$$\hat{V}_{bemf} = V_m - (R_{T1} + k(T-T_1))*i(t) - V_{offset} \quad \text{Equation 9}$$

where $\hat{V}_{bemf}(t)$ is the BEMF voltage after temperature compensation. Since $R_{T1}$, k and $V_{m\_0}$ are known and are stored in memory 156, the VCM BEMF, $\hat{V}_{bemf}(t)$, can be obtained at any time by measuring $V_m$ and T (step 206 of FIG. 4). As mentioned above, the measurement of $V_m$ is carried out by voltage sensor 152 and current VCM temperature, T, is measured by sensor 132.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive data storage system while maintaining substantially the same functionality without departing from the scope and spirit of the present invention. In addition, although the preferred embodiment described herein is directed to BEMF voltage measurement of a disc drive VCM, it will be appreciated by those skilled in the art that the teachings of the present invention can be applied to other dynamic systems in which BEMF measurement is carried out, without departing from the scope and spirit of the present invention.

It should be noted that thermistors used to compensate for the affect of temperature on write operations in conventional disc drives are suitable for determining VCM temperature in accordance with the present invention. Therefore, the present invention can be implemented without major hardware additions/modifications to conventional disc drives. In addition to being utilized during head load/unload operations, the BEMF voltage measured in accordance with the present invention can also be used for actuator velocity control when the head flies over the disc surface during normal disc drive operation. The disc drive can be based upon magnetic, optical, or other storage technologies and may or may not employ a flying slider.

What is claimed is:

1. A method of measuring a back electromotive force (BEMF) voltage of a voice coil motor (VCM), the method comprising:
    obtaining a temperature of the VCM;
    obtaining an offset voltage of electrical hardware circuitry associated with the VCM; and
    computing the BEMF voltage of the VCM as a function of the temperature of the VCM and as a function of the offset voltage.

2. The method of claim 1 wherein the temperature of the VCM is obtained from a temperature sensor that is thermally coupled to the VCM.

3. The method of claim 2 wherein the temperature sensor comprises a thermistor.

4. The method of claim 1 further comprising storing the offset voltage of electrical hardware circuitry associated with the VCM prior to carrying out the computing the BEMF voltage.

5. The method of claim 1 further comprising measuring a resistance value of the VCM at an initial VCM temperature prior to carrying out the computing the BEMF voltage.

6. The method of claim 5 further comprising storing the resistance value of the VCM at the initial VCM temperature prior to carrying out the computing the BEMF voltage.

7. The method of claim 5 wherein the computing the BEMF voltage further comprises computing the BEMF voltage of the VCM as a function of the resistance value of the VCM at the initial VCM temperature.

8. The method of claim 1 wherein the computing the BEMF voltage further comprises computing the BEMF voltage of the VCM as a function of a voltage measured across a coil of the VCM.

9. An apparatus for measuring a BEMF voltage of a VCM, comprising:
    a BEMF voltage measurement circuit configured to obtain a temperature of the VCM and measure an offset voltage of electrical hardware circuitry associated with the VCM,
    wherein the BEMF voltage measurement circuit is further configured to compute the BEMF voltage of the VCM as a function of the temperature of the VCM and as a function of the offset voltage.

10. The apparatus of claim 9 wherein the BEMF voltage measurement circuit is configured to obtain the temperature of the VCM from a temperature sensor that is thermally coupled to the VCM.

11. The apparatus of claim 10 wherein the temperature sensor comprises a thermistor.

12. The apparatus of claim 9 wherein the BEMF voltage measurement circuit is further configured to store the offset voltage of electrical hardware circuitry associated with the VCM.

13. The apparatus of claim 9 wherein the BEMF voltage measurement circuit is further configured to measure a resistance value of the VCM at an initial VCM temperature.

14. The apparatus of claim 13 wherein the BEMF voltage measurement circuit is further configured to store the resistance value of the VCM at the initial VCM temperature.

15. The apparatus of claim 9 wherein the BEMF voltage measurement circuit is further configured to compute the BEMF voltage of the VCM as a function of a voltage measured across a coil of the VCM.

16. An apparatus for measuring a BEMF voltage of a VCM, comprising:
    means for obtaining a temperature of the VCM andfor computing the BEMF voltage of the VCM as a function of the temperature of the VCM.

* * * * *